US011820637B2

(12) United States Patent
Otto

(10) Patent No.: US 11,820,637 B2
(45) Date of Patent: *Nov. 21, 2023

(54) SYSTEM AND METHOD FOR STORING AND SELECTIVELY DISPENSING LIQUIDS

(71) Applicant: Versabev, Inc., Wilmington, DE (US)

(72) Inventor: Harry Otto, Bronxville, NY (US)

(73) Assignee: Versabev, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,648

(22) Filed: Dec. 15, 2020

(65) Prior Publication Data

US 2021/0094811 A1    Apr. 1, 2021

Related U.S. Application Data

(63) Continuation of application No. 15/824,910, filed on Nov. 28, 2017, now Pat. No. 10,865,089, which is a
(Continued)

(51) Int. Cl.
*B67D 1/04* (2006.01)
*B67D 1/08* (2006.01)
(Continued)

(52) U.S. Cl.
CPC ......... *B67D 1/0001* (2013.01); *B67D 1/0462* (2013.01); *B67D 1/0801* (2013.01);
(Continued)

(58) Field of Classification Search
CPC ...... B67D 1/0001; B67D 1/0801; B67D 3/00; B67D 2001/0828; B67D 2210/00049; B67D 2210/00062; F16L 37/0925
(Continued)

(56) References Cited

U.S. PATENT DOCUMENTS 3,698,417 A    10/1972   Smith
3,756,459 A     9/1973   Bannister
(Continued)

FOREIGN PATENT DOCUMENTS

CA    2849116 A1    4/2013
CN    1784354       6/2006
(Continued)

OTHER PUBLICATIONS

European Patent Application No. 15751333.4, Examination Report dated Sep. 26, 2019.
(Continued)

*Primary Examiner* — Jeremy Carroll
(74) *Attorney, Agent, or Firm* — Ahmann Kloke LLP

(57) ABSTRACT

The inventive system and method advantageously enable superior preserved storage and selective dispensation of liquids by storing wine (or other liquids) in a pressurized environment to ensure that the stored liquid does not come into contact with air, and then by selectively dispensing a portion of the stored liquid, in accordance with a desired dispensing regime, by utilizing a controlled source of pressure force to apply a sufficient pressure to the pressurized environment to expel the desired volume of the liquid in a pressurized stream directed to a dispensing/pouring interface through a conduit or equivalent delivery system. In at least several novel embodiments thereof, the system and method of the present invention are configured for use with wine-in-bag ("WinB") products.

20 Claims, 3 Drawing Sheets

Related U.S. Application Data continuation of application No. 15/007,150, filed on Jan. 26, 2016, now Pat. No. 9,896,320, which is a continuation of application No. 14/055,876, filed on Dec. 20, 2013, now Pat. No. 9,242,845, which is a continuation-in-part of application No. 13/720,583, filed on Dec. 19, 2012, now abandoned, which is a continuation-in-part of application No. 13/329,282, filed on Dec. 18, 2011, now abandoned.

(60) Provisional application No. 61/530,509, filed on Sep. 2, 2011.

(51) Int. Cl.
  B67D 1/00 (2006.01)
  B67D 3/00 (2006.01)
  F16L 37/092 (2006.01)

(52) U.S. Cl.
  CPC ............ B67D 3/00 (2013.01); F16L 37/0927 (2019.08); *B67D 2001/0828* (2013.01); *B67D 2210/00049* (2013.01); *B67D 2210/00062* (2013.01); *B67D 2210/00099* (2013.01); *F16L 37/0925* (2013.01)

(58) Field of Classification Search
  USPC .......................................................... 222/95
  See application file for complete search history.

(56) References Cited

U.S. PATENT DOCUMENTS

| | | | |
|---|---|---|---|
| 3,933,282 A * | 1/1976 | Stevens, Jr. .......... | B67D 1/0829 222/400.7 |
| RE32,354 E | 2/1987 | Savage | |
| 4,921,135 A * | 5/1990 | Pleet ..................... | B67D 1/0869 222/105 |
| 4,997,108 A | 3/1991 | Tata | |
| 5,011,700 A * | 4/1991 | Gustafson ............ | B67D 1/0462 261/DIG. 7 |
| 5,096,092 A | 3/1992 | Devine | |
| 5,240,144 A * | 8/1993 | Feldman .............. | B67D 1/0462 222/105 |
| 5,251,787 A * | 10/1993 | Simson ................ | B67D 1/0462 222/394 |
| 5,499,758 A * | 3/1996 | McCann ................ | B67D 1/045 222/400.7 |
| 5,775,364 A | 7/1998 | Erb | |
| 5,799,830 A * | 9/1998 | Carroll ................. | B67D 7/0255 222/530 |
| 6,131,767 A | 10/2000 | Savage | |
| 6,138,995 A | 10/2000 | Page | |
| 6,352,176 B1 | 3/2002 | Hartsell, Jr. | |
| 6,607,100 B2 | 8/2003 | Phelps | |
| 6,669,051 B1 * | 12/2003 | Phallen .................... | B67C 3/28 222/394 |
| 6,799,085 B1 | 9/2004 | Crisp, III | |
| 6,848,602 B2 | 2/2005 | deCler | |
| 8,109,301 B1 | 2/2012 | Denise | |
| 10,214,408 B2 * | 2/2019 | Istin ..................... | B67D 1/0888 |
| 11,091,360 B2 * | 8/2021 | Christiansen ........ | B67D 1/0884 |
| 2003/0038145 A1 * | 2/2003 | Arellano .............. | B67D 1/0418 222/399 |
| 2003/0070555 A1 | 4/2003 | Reyhanloo | |
| 2003/0098314 A1 * | 5/2003 | Phelps ................. | B67D 7/0266 222/1 |
| 2003/0102335 A1 * | 6/2003 | Barnett ................. | B05B 9/0838 222/386.5 |
| 2003/0205581 A1 * | 11/2003 | Wertenberger ........ | B65D 77/06 222/129 |
| 2004/0245281 A1 | 12/2004 | Oke | |
| 2005/0194399 A1 * | 9/2005 | Proctor ................ | B67D 1/0881 222/1 |
| 2005/0224523 A1 | 10/2005 | O'Dougherty | |
| 2006/0175352 A1 * | 8/2006 | Emmendorfer ....... | B08B 9/0325 222/1 |
| 2006/0207997 A1 * | 9/2006 | Aguirre ................ | B67D 1/0406 222/1 |
| 2006/0283879 A1 | 12/2006 | Rasmussen | |
| 2007/0187848 A1 | 8/2007 | Sabadicci | |
| 2007/0204930 A1 * | 9/2007 | Phallen ................ | B67D 1/0888 222/394 |
| 2007/0205219 A1 | 9/2007 | Ziesel | |
| 2007/0284371 A1 * | 12/2007 | Anderson ............. | B65D 7/045 222/397 |
| 2008/0142115 A1 * | 6/2008 | Vogt ....................... | B67D 1/124 141/374 |
| 2008/0163641 A1 | 7/2008 | Mitchell | |
| 2008/0206429 A1 | 8/2008 | Guerrero | |
| 2009/0069930 A1 | 3/2009 | Peters | |
| 2009/0069931 A1 | 3/2009 | Peters | |
| 2009/0069947 A1 | 3/2009 | Newman | |
| 2009/0069949 A1 | 3/2009 | Carpenter | |
| 2009/0157432 A1 | 6/2009 | Palmroos | |
| 2009/0159612 A1 | 6/2009 | Beavis et al. | |
| 2010/0006603 A1 | 1/2010 | Weinberg | |
| 2010/0163572 A1 | 7/2010 | Downham | |
| 2010/0276452 A1 * | 11/2010 | Vesborg ............... | B67D 1/0878 222/144.5 |
| 2011/0017776 A1 | 1/2011 | Metropulos et al. | |
| 2011/0054706 A1 | 3/2011 | Murphy | |
| 2011/0316175 A1 | 12/2011 | Kumar et al. | |
| 2013/0062366 A1 | 3/2013 | Tansey | |
| 2014/0014687 A1 | 1/2014 | Cornwell | |

FOREIGN PATENT DOCUMENTS

| | | |
|---|---|---|
| CN | 101010241 | 8/2007 |
| EP | 2154103 | 2/2010 |
| GB | 2146705 | 4/1985 |
| WO | 2011000021 | 1/2011 |
| WO | 2011061344 | 5/2011 |
| WO | 2012084166 | 6/2012 |
| WO | 2013042101 A1 | 3/2013 |

OTHER PUBLICATIONS

European Patent Application No. 15751333.4, Partial Search Report dated Nov. 9, 2017.

International Application No. PCT/US2015/017386, International Search Report and Written Opinion dated May 26, 2015.

European Patent Application No. 15751333.4, Examination Report dated Aug. 5, 2021.

European Patent application No. 22192238.8, Extended European Search Report dated Dec. 5, 2022, 14 Pages.

\* cited by examiner

SYSTEM AND METHOD FOR STORING AND SELECTIVELY DISPENSING LIQUIDS

CROSS-REFERENCE TO RELATED APPLICATIONS

The present patent application is a continuation of, and claims priority from U.S. patent application Ser. No. 15/824,910 entitled "SYSTEM AND METHOD FOR STORING AND SELECTIVELY DISPENSING LIQUIDS" filed Nov. 28, 2017, and is a continuation of, and claims priority from U.S. patent application Ser. No. 15/007,150 entitled "SYSTEM AND METHOD FOR STORING AND SELECTIVELY DISPENSING LIQUIDS" filed Jan. 26, 2016, which is a continuation of, and claims priority from U.S. patent application Ser. No. 14/055,876 entitled "SYSTEM AND METHOD FOR STORING AND SELECTIVELY DISPENSING LIQUIDS" filed Dec. 20, 2013, now U.S. Pat. No. 9,242,845, which is a continuation of, and claims priority from U.S. patent application Ser. No. 13/720,583 entitled "SYSTEM AND METHOD FOR STORING AND SELECTIVELY DISPENSING LIQUIDS" filed Dec. 19, 2012, which is a continuation-in-part of, and claims priority from U.S. patent application Ser. No. 13/329,282 entitled "SYSTEM AND METHOD FOR INTERFACING WITH, AND CONTROLLING, BEVERAGE DISPENSING CONTAINERS" filed Dec. 18, 2011, which claims priority from the commonly assigned U.S. Provisional Application No. 61/530,509 entitled "SYSTEM AND METHOD FOR STORING AND SELECTIVELY DISPENSING LIQUIDS" filed Sep. 2, 2011, all of which are hereby incorporated by reference herein.

FIELD OF THE INVENTION

The present invention relates generally to systems and methods for storing and dispensing liquids, and more particularly to systems and methods for selectively dispensing liquids (such as wine or similar beverages) stored in a pressurized environment by utilizing a controlled source of pressure force to apply a sufficient pressure to the pressurized environment to dispense a portion of the stored liquid in accordance with a desired dispensing regime.

BACKGROUND OF THE INVENTION

The ever-increasing consumption of wine and similar beverages, both in various commercial establishments (e.g., restaurants, bars, lounges, etc.), and in consumers' homes, coupled with growth in consumer perception of wine as an "experience" meant to be paired with proper food or enjoyed though "tastings," has resulted not only in a growing consumer demand for a wider selection of wines made available in commercial establishments (leading to proliferation of dedicated "wine bar" establishments), but also fueled the desire of many consumers to be able to bring the "wine bar" or equivalent experience to their home.

While restaurants have traditionally relied on bottle purchases by their patrons, leaving only a few low-end wines available for "by the glass" pours from bottles that may remain in use for several days after being opened, due in large part to the inherent changes (e.g., oxidation) in wine over time when exposed to air, eventually leading to deterioration and spoilage. However, in view of the above-noted market trends, many establishments have been nevertheless forced to expand their "by-the-glass" (hereinafter "BTG") selections to meet consumer demand, but at a greatly increased cost (both due to rapid deterioration of unsealed wine bottles, and due to increased costs in labor in managing a wide-range of BTG pours). Stand-alone bars and lounges have traditionally offered limited wine selections, but in view of the aforementioned trends, they were likewise faced with the same obstacles as the restaurants. Finally, wine bars were forced to deal with the challenge of keeping a sufficiently wide ranging BTG selection by their very nature.

Virtually all attempted solutions to the above challenges involved devices and systems for preservation and/or dispensation of bottled wines, and thus were quite limited in their success due to inherent disadvantages of utilization of bottled wine in a commercial establishment environment, as described in greater detail in the commonly assigned U.S. provisional patent application entitled "SCALABLE MODULAR SYSTEM AND METHOD FOR STORING, PRESERVING, MANAGING, AND SELECTIVELY DISPENSING BEVERAGES," Ser. No. 61/530,491, which had been incorporated by reference in the '282 application, and which is hereby incorporated by reference herein in its entirety. The '491 application also notes that while many disadvantages of the use of bottled wine in commercial establishments are clearly overcome by the utilization of larger volume less expensive "wine bags" (often offered in a "wine-in-bag"/"bag-in-box" format), to date there has not been a suitable solution offered that would enable commercially practical use of wine-in-bag (hereinafter "WinB") products in restaurant/bar environments.

Similarly, while some consumers have invested varying degrees of resources into wine preservation and/or dispensing systems for their home/office use, as is described in greater detail in the commonly assigned U.S. provisional patent application entitled "SYSTEM AND METHOD FOR STORING, PRESERVING AND SELECTIVELY DISPENSING BEVERAGES," Ser. No. 61/530,503, which had been incorporated by reference in the '282 application, and which is hereby incorporated by reference herein in its entirety, a growing number of consumers have also realized the advantages of WinB products, which has led to a growing selection of such products being made available. Nevertheless, as is noted in the '503 application, virtually all commercially available WinB products involved the use of boxes or equivalent containers for the bagged wine with simple lever or pushbutton-operated pouring spouts interfacing with the WinB product in the box/container, which clearly carried additional disadvantages of their own, that various offered solutions have failed to address.

As is noted in both the '491 and '503 applications, the key obstacles to wide-ranging successful use of WinB products in both commercial and consumer environments include, but are not limited to: the difficulties in preserving and pouring wine from WinB product containers; the amount of space taken up by WinB products and their containers—an especially serious issue for commercial environments where space is at a premium; the challenge posed in commercial environments by the necessity of metering wine pours of specific volume from the WinB products, and the difficulty in tracking such pours automatically; and The aesthetic appearance of most WinB products and their containers does permit their use in tastefully decorated commercial and consumer environments.

It would thus be desirable to provide a system and method that resolves all of the disadvantages of previously known WinB products and their dispensing containers. It would further be desirable to provide a system and method that offers heretofore unavailable advantageous features relating to preservation and controlled dispensing of liquids, such as wine, from WinB products or equivalents. It would additionally be desirable to provide a system and method for preserved storage and selective controlled dispensation of liquids, such as wine, that is configurable for use with a variety of WinB products, and their equivalents, that is modular and readily scalable for advantageous utilization in environments ranging from consumer homes to large commercial establishments.

BRIEF DESCRIPTION OF THE DRAWINGS

In the drawings, wherein like reference characters denote corresponding or similar elements throughout the various figures.

SUMMARY OF THE INVENTION

Figure 1:
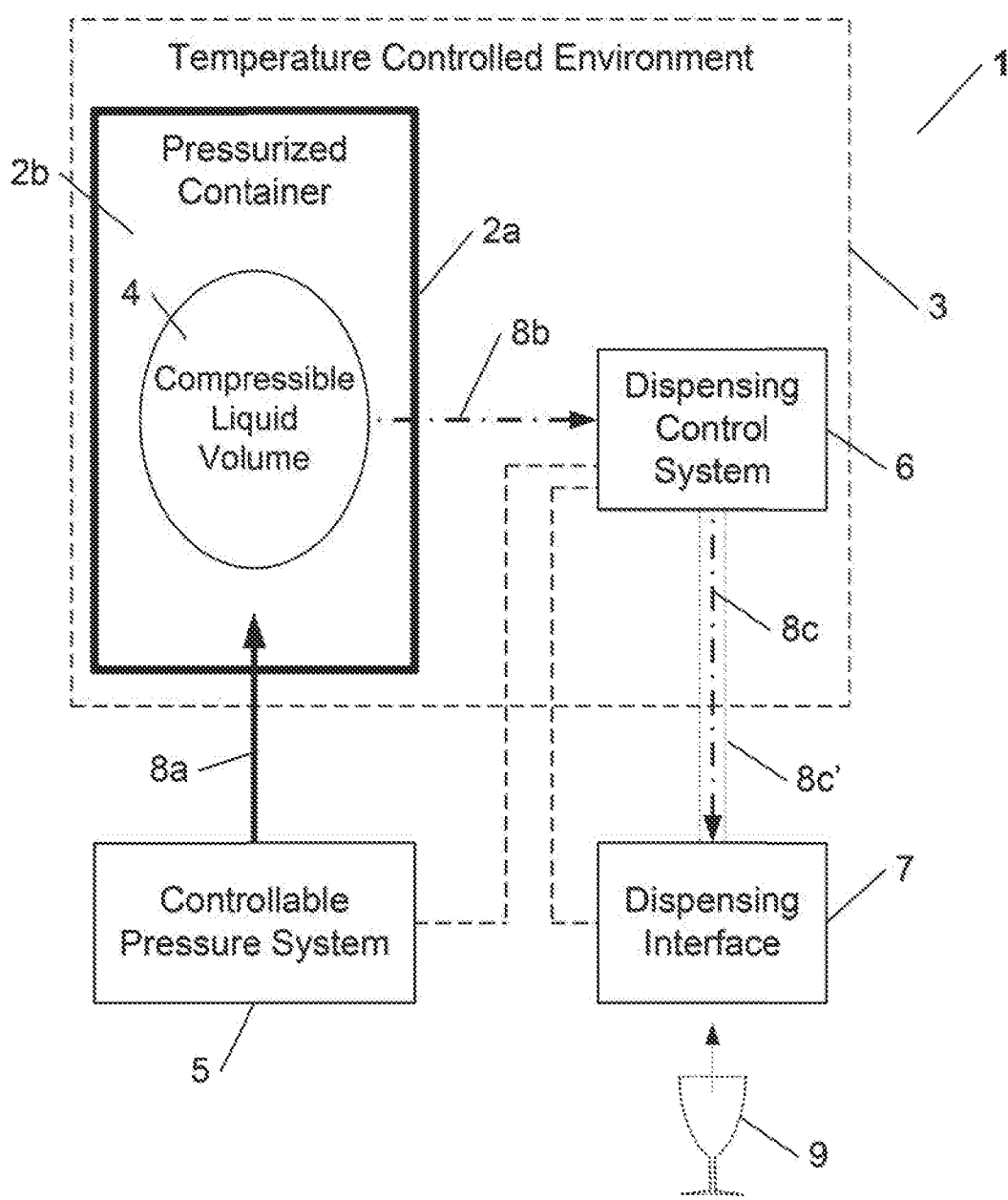
FIG. 1 is a diagram of a first exemplary embodiment of the inventive system and method for storing and selectively dispensing liquids.

The inventive system and method advantageously enable superior preserved storage and selective dispensation of liquids by storing wine (or other liquids) in a pressurized environment to ensure that the stored liquid does not come into contact with air, and then by selectively dispensing a portion of the stored liquid, in accordance with a desired dispensing regime, by utilizing a controlled source of pressure force to apply a sufficient pressure to the pressurized environment to expel the desired volume of the liquid in a pressurized stream directed to a dispensing/pouring interface through a conduit or equivalent delivery system.

In at least one embodiment thereof, the system and method of the present invention are configured for use with wine-in-bag ("WinB") product containers (or with any liquids stored in anaerobic compressible containers), where the compressible container is placed into a pressurized chamber and interfaced with a liquid delivery conduit connected to a dispensing component, whereupon, a desired volume of liquid may be selectively expelled from the compressible container, and delivered to the dispensing system by utilizing a controlled source of pressure force to sufficiently increase pressure in the pressurized chamber to force the desired quantity of liquid from the compressible bag into the delivery conduit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The inventive system and method for storing and selectively dispensing liquids, in various embodiments thereof, remedies the flaws and drawbacks of all previously known wine storage and dispensing solutions, regardless of their configuration, by storing the wine (or other liquids) in a pressurized environment to ensure that the stored liquid does not come into contact with air, and then by selectively dispensing a portion of the stored liquid, in accordance with a desired dispensing regime, by utilizing a controlled source of pressure force to apply a sufficient pressure to the pressurized environment to expel the desired volume of the liquid in a pressurized stream directed to a dispensing/pouring interface.

At the outset, it should be noted that while the various descriptions of the system and method of the present invention describe the utilization thereof with wine or other perishable beverages, it should be understood to one skilled in the art that the various embodiments of the inventive system and method can be readily utilized in conjunction with storage and selective dispensation of any liquid substance (for example paint, solvents, chemical or pharmaceutical agents, etc.) as a matter of design choice or necessity without departing from the spirit of the invention. Similarly, while the inventive system and method are described as being operable for use with WinB products, virtually any anaerobic compressible container can be readily substituted, or even integrated into the pressurized chamber (e.g., as a lining, etc.).

In view of the above, for example, the inventive system and method can even be readily adapted for use in a sterile healthcare environment for preserving and selectively dispensing donor blood for use in blood transfusions, and the like.

The essence of the present invention is that a liquid (e.g., wine) is stored in a pressurized environment under regulated pressure sufficient to maintain it in an anaerobic state (for example the liquid may be stored in a compressible bag disposed inside a sealed pressurized chamber), whereupon the liquid can be selectively dispensed through a normally locked dispensing conduit connected to its pressurized environment, while maintaining the anaerobic status of the remaining liquid, maintaining a predetermined level of pressure on the stored liquid, that is sufficient to expel the stored liquid in response to the dispensing conduit being selectively unlocked for as long as the conduit is open, in accordance with one or more predetermined dispensing profiles, each such profile comprising dispensing parameters that include, but that are not limited to, the volume of liquid to be dispensed, the distance the dispensed liquid will need to travel along the conduit to a dispensing system/interface to be poured, etc. Preferably the pressurization system compensates for the gradual decrease in the volume of the stored liquid such that system performance is maintained after multiple dispensations.

While a number of liquid transport solutions exist, attempting to apply them to address the above-noted challenges of WinB product utilization, reveals their significant disadvantages that render such utilization impractical. For example, the majority of liquid transport systems utilize mechanical pumps, with a separate pump being required for each liquid dispensing line (greatly increasing the cost of any implementation that requires delivery of multiple liquids (i.e., a selection of wines) to a remote dispensing target). Moreover, pumps generate heat during their operation, which has a significant negative impact on temperature-sensitive liquids (such as wines). Additionally, a mechanical pump requires that a liquid-filled bag (e.g., a WinB product) be placed in a holding vessel, with the nozzle positioned on the bottom of the bag, and because the mechanical pump does not pull the liquid (e.g., the wine) from its container (e.g., the bag), it can never fully empty the contents of the bag, resulting in ongoing losses of valuable products (and creating additional difficulties in depleted bag disposal. Furthermore, as dispensing WinB products is a very intermittent process, subjecting the pump to constant starts/stops greatly increases its wear/tear and leads to a sizable reduction in the pump's useful life.

Other liquid transport solutions eschew the use of mechanical pumps and instead rely on a "gravity feed" approach coupled with utilization of regulation flow meters. However, because any liquid transport system based on such a solution will not be able to transport any liquid from its container to a dispensing location that is at the same level as, or elevated above, the portion of a bag from which the liquid exits. Moreover, the performance of any gravity feed solution suffers when the dispensing target, to which the liquid must be transported, is not positioned significantly below the bag from which the liquid is being dispensed.

Finally, both of the above-described previously known liquid transport solutions also suffer from one more common drawback. In the context of their utilization to dispense WinB products, it would be nearly impossible to configure either of the solutions to quickly deliver carefully metered pours on demand. Not only does this flaw increases costs due to over-dispensing expensive wines, but there are significant operational costs in commercial beverage service environments incurred when establishment staff must spend sufficient time to ensure an accurate pour.

The system and method of the present invention not only readily address and solve the drawbacks and disadvantages of all previously known liquid transport solutions, but also provide a number of heretofore unseen advantages, particularly when utilized in connection with WinB products to dispense wine. Specifically, in various exemplary embodiments thereof, the inventive pressurized liquid storage and dispensing system is capable of transporting/dispensing wine locally, or to significantly remote dispensing locations at extremely high speed and with a great deal of accuracy without spillage. Moreover, the novel systems' rapid transport of the wine across a suitable distance also subjects the wine to controlled oxygenation (which when property administered, is widely considered to enhance the positive attributes of most wines). This highly desirable feature of the present invention is particularly advantageous in view of the fact that in many wine bars/fine dining establishments, quite a bit of time is spent to "aerate" the wine prior to serving it—a process which would be rendered unnecessary if the inventive system is deployed. Therefore, when used with WinB products, the rapid transport aspect of the inventive system is not only beneficial in terms of time savings for accurate pours, but also enhances the quality of the dispensed wine.

In addition, the inventive system is highly (and easily) configurable to ensure rapid highly accurate pours over a wide range of distances through the use of predefined pressure vs. time algorithms to automatically manage pour rate accuracy for one or more predetermined pour sizes.

Referring now to FIG. 1, a first exemplary embodiment of the inventive system and method for storing and selectively dispensing liquids is shown as a Pressurized Liquid Storage and Dispensing ("PLSD") system 1. The PLSD system 1 includes a pressurized container 2a (e.g., an airtight high-pressure seal rated tank, vessel or equivalent) for storing a compressible liquid volume 4 (e.g., a flexible WinB product) within a pressurized environment 2b), a controllable pressure system 5 (e.g., a compressor, a compressed air (or other gas) tank, or an air pump connected to an air pressure stabilizer and an air pressure regulator) that is connected to the pressurized environment 2b through a pressure delivery conduit (e.g. tubing or piping) 8a. It should be noted that the controllable pressure system 5 may be readily selected from a variety of devices/systems operable to generate and maintain the pressurized environment 2b within the desired parameters. For example, the controllable pressure system 5 can utilize non-air gas, or another fluid. Alternately the pressure force for the controllable pressure system 5, may be generated through gravity, preconfigured compressed air/gas container, or through other non-pumping means.

In an alternate embodiment of the present invention, the pressurized container 2a may be configured such that the compressible liquid volume 4 is implemented directly in the pressurized environment 2b, without being encased in a compressible flexible container. In this alternate configuration, a dispensing conduit 8b (which may be plastic or metal tubing, or equivalent), would be directly connected to the pressurized container 2a (as opposed to being connected to the liquid volume 4 interface), while the controllable pressure system 5 would be selected and configured to provide direct pressurization to the compressible liquid volume 4, for example by volumetric compression of the internal region of the pressurized container 2a (e.g., by hydraulic/piston-like compression thereof) to generate and maintain the pressurized environment 2b within the necessary/desired parameters. The dispensing conduit 8b may include one or more in-line 1-way check valves to minimize the amount of liquid that remains therein after each time the PLSD system 1 dispenses the liquid therethrough.

The PLSD system 1 also includes a dispensing control system 6 (e.g., a solenoid valve coupled to a dispensing controller (which may range from a solid state electronic control to a computerized system operable to independently control multiple solenoid valves)), that is connected to the compressible liquid volume 4 via the conduit 8b. The dispensing control system 6 is also connected to a dispensing interface 7, via a conduit 8c (which may likewise comprise plastic or metal tubing, or equivalent). Optionally, the conduit 8c may be positioned within a hollow protective housing 8c', enabling the easy removal and replacement of conduit 8c when needed.

Figure 3:
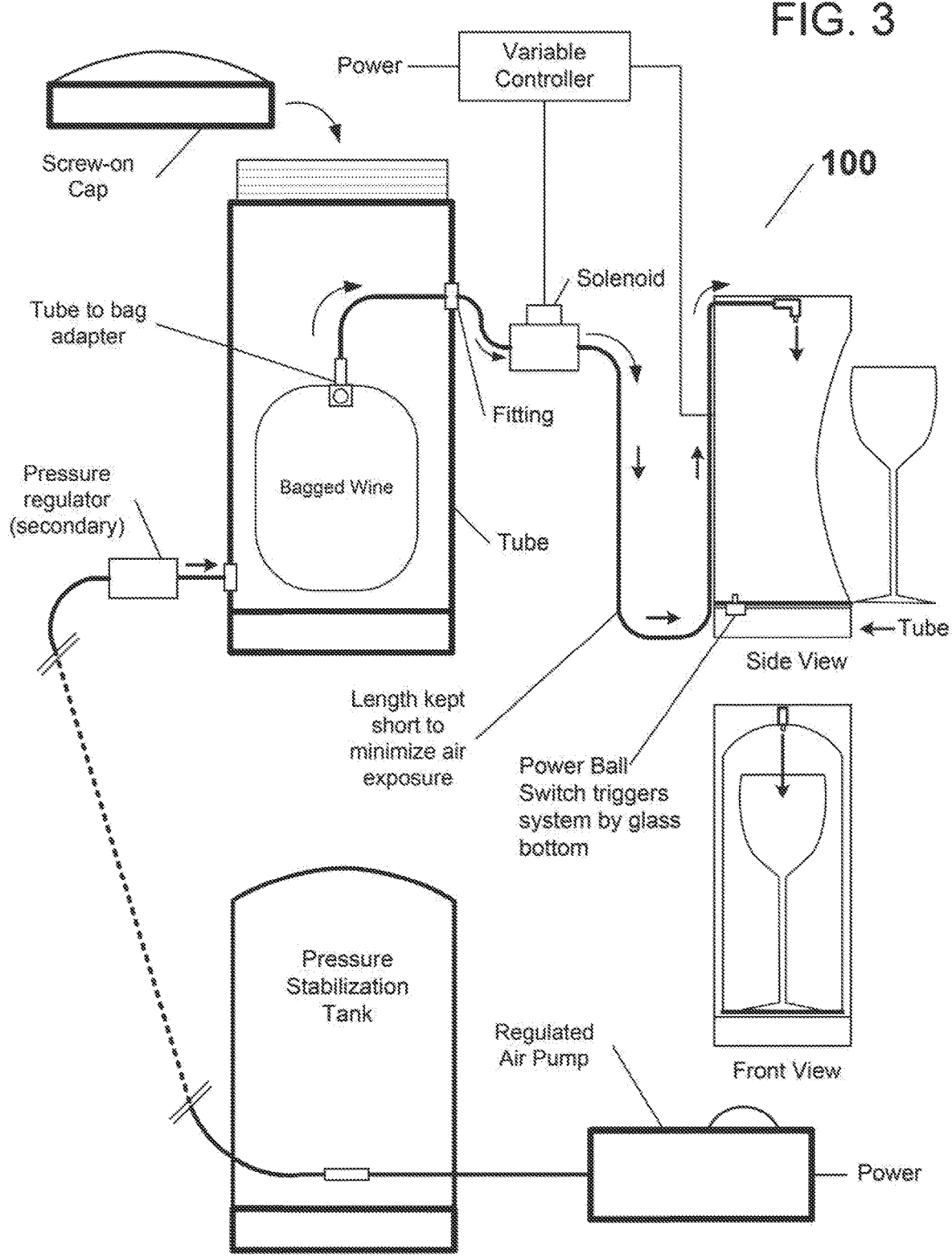
FIG. 3 is a diagram of a third exemplary embodiment of the inventive system and method for storing and selectively dispensing liquids, configured as an exemplary implementation of the inventive system and method of FIG. 2.

The dispensing interface 7 may comprise any apparatus, device or system suitable for pouring the dispensed liquid into an appropriate target container 9 (e.g., a wine glass, or another beverage glass or cup), when the dispensing function of the PLSD system 1 is activated. For example, the dispensing interface 7 may be a simple spout, and/or it may include one or more additional components and features, or equivalents thereof, such as: (1) A hand-operated "dispensing gun," connected to a flexible hollow protective housing 8c', for selectively dispensing liquid from the liquid volume 4 in a predetermined dispensed volume (e.g., dispensing a "metered pour"), into any target container 9. Optionally, a dispensing gun embodiment of the dispensing interface 7 may be supplied with a splash protector component (not shown), such as a flexible flange or equivalent element surrounding a pour component (not shown), so that when the dispensing interface 7 is positioned above the target container 9, the splash protector component prevents the liquid being dispensed through a metered pour at high speed does not leave the target container 9 regardless of variance in the angle of the dispensing interface 7 with respect to the central vertical axis of the target container 9, (2) a vertically elongated housing comprising an opening sized and configured to receive the target container 9 therein, such that the target container 9 can be positioned beneath a pour element (not shown) to ensure that the dispensed liquid enters, and remains entirely within, the target container 9 during the dispensing process, (3) an aeration module to additionally aerate the wine prior to it being dispensed (i.e. in addition to oxygenation that the wine is already subjected to, during its transport), (4) a local control (e.g., a button, and/or a switch, and/or a sensor) operable to cause the dispensing control system 6 to dispense the liquid from the liquid volume 4 in a metered pour, either manually (when activated by a user), or automatically (for example by signaling to the dispensing control system 6 when the target container 9 is positioned and ready to receive the metered pour (for example through a pressure switch in a dispensing interface 7 platform on which the target container 9 is positioned (as shown by way of example in the exemplary FIG. 3 illustrating an exemplary embodiment of a PLSD system 100), and/or (5) an optional light source operable to illuminate the target container 9 into which the liquid is being dispensed during the dispensing process, such that the cessation of the illumination serves as an indicator that the dispensation has been completed (the completion of the dispensation may also/alternately be indicated by other means, such as by an audio signal).

Alternately, the dispensing interface 7 may comprise a more complex system that integrates all, or part, of the functionality of the dispensing control system 6.

Optionally, the dispensing control system 6 may be connected to the controllable pressure system 5, such that it may be operable to provide any necessary control functions, such as pressure maintenance/regulation, or, in an alternate embodiment of the present invention, when activated (for example, from the dispensing interface 7 through a link therewith), the dispensing control system 6 may instruct the controllable pressure system 5 to briefly increase the level of pressure in the pressurized environment 2b for all or a portion of the duration of a dispensing period to provide additional force and velocity to liquid being expelled from the liquid volume 4 (for example if the dispensing interface 7 is particularly distant from the pressurized container 2a).

As noted above, the PLSD system 1 is operable through selective activation of the dispensing control system 6 (through a remote signal from an external controller (e.g., a restaurant management system)), and/or via an activation signal from the dispensing interface 7 (e.g., by a button, pressure, IR or equivalent switch). In accordance with one or more predefined dispensing profiles, the dispensing control system 6 opens the path therethrough for the conduit 8b causing the pressurized liquid to be immediately expelled from the liquid volume 4, through the dispensing control system 6 and the conduit 8c to be poured at the dispensing interface 7 (in the case when the dispensing control system 6 and dispensing interface 7 are integrated, the conduit 8c is eliminated).

A dispensing profile may be as simple as a predetermined group of settings fully or partially locked into the PLSD system 1, that control pressurization, duration of the dispensing period, and other parameters. Or in more sophisticated implementations of the inventive PLSD system 1, a particular dispensing profile may be issued by a remote controller that regulates the volume of the dispensed pour depending on a customer order, and/or that may provide instructions for additional operations. For example, in accordance with such instructions, the dispensed wine can be diverted and then retrieved from (e.g., via an additional set of solenoid valves) a parallel wine aeration and/or accelerated aging system, prior to being poured. The implementation of deployment profiles in the inventive PLSD system 1, is preferably supported by at least one predefined pressure vs. time algorithm that may be executed by the dispensing control system 6 to automatically manage pour rate accuracy for one or more predetermined pour sizes, at the dispensing interface 7. In one embodiment of the present invention, the remote controller may include a mobile device with a corresponding software application comprising a graphical user interface, installed thereon.

In an alternate embodiment of the PLSD system 1, the pressurized container 2a (and optionally the conduits 8b, 8c, and the dispensing control system 6) may be positioned in a temperature controlled environment 3 that is suitable for temperature stable storage of the liquid being dispensed from the liquid volume 4. The temperature controlled environment 3 may be passive (such as a cellar/basement), active (such as a refrigerated housing (or refrigerated jacketing or coils positioned around the pressurized container 2a), or a cold plate (or equivalent), or ice or equivalent freezable cold elements, positioned proximally to the pressurized container 2a (such under the bottom thereof), or a combination of one or more of the above (such as a climate controlled wine cellar). Additionally, a temperature control component may be positioned surrounding the liquid volume 4 (such as a cooling jacket around a wine bag).

In alternate embodiments of the present invention, the PLSD system 1 may be positioned on a mobile cart (not shown) or on an equivalent mobile platform, wherein the controllable pressure system 5 may comprise one or more air tanks, wherein the dispensing interface 7 may comprise a dispensing gun (as described above), and wherein the dispensing control system may comprise a mobile device supplied with a corresponding user-controlled application.

Figure 2:
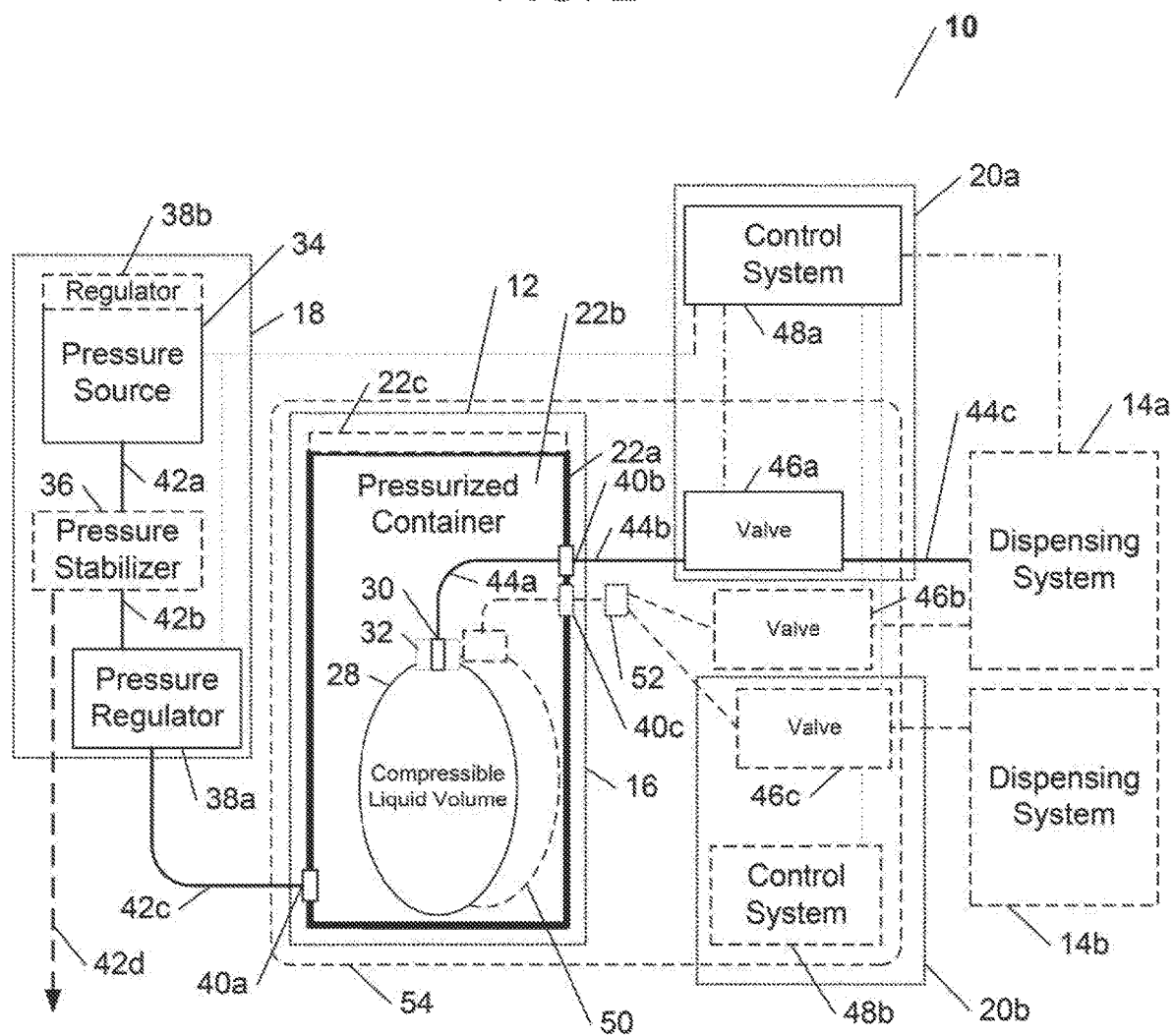
FIG. 2 is an exemplary diagram of a second exemplary embodiment of the inventive system and method for storing and selectively dispensing liquids.

Referring now to FIG. 2, a second exemplary embodiment of the inventive system and method for storing and selectively dispensing liquids, is shown as a Pressurized Liquid Storage and Dispensing ("PLSD") system 10. The PLSD system 10, by way of example, illustrates multiple alternate embodiments of the PLSD system 1 of FIG. 1, highlighting the highly configurable and scalable properties of the system and method of the present invention (for example showing that the novel system can be readily utilized with multiple WinB products within a single pressurized container, and may comprise the capability of rapidly and accurately transporting the liquid from each stored compressible liquid volume to a common remote dispensing system, or to a plurality of proximal and/or dispersed dispensing systems. The PLSD system 10, as described below in connection with FIG. 2, also demonstrates its capability to employ a wide range of pressurization, liquid transport, and dispensing options, without departing from the spirit of the present invention.

The PLSD system 10 includes a pressurized container 22a (e.g., an airtight high-pressure seal rated tank, vessel or equivalent), for storing a compressible liquid volume 28 (e.g., a flexible WinB product) within a pressurized environment 22b. The compressible liquid volume 28 includes a volume interface 32 (e.g., a nozzle or equivalent) for accessing the liquid stored therein, preferably configured for a sealed/airtight connection to a releasable coupling 30 (such as a connector/compression filling), that in turn connects the compressible liquid volume 28 to a conduit 44a/44b. While the volume interface 32 and the releasable coupling 30 may be preconfigured to readily form a releasable sealed connection, in an alternate embodiment of the present invention, the releasable coupling 30 may comprise a "universal adapter" component, operable to enable the adaptive releasable coupling 30 to form a secure sealed (but releasable) connection with virtually any variation of the volume interface 32. Various embodiments of a novel adaptive releasable coupling that would be particularly advantageous for use as the adaptive releasable coupling 30, are described in greater detail in the co-pending commonly assigned U.S. provisional patent application entitled "SYSTEM AND METHOD FOR INTERFACING WITH, AND CONTROLLING, BEVERAGE DISPENSING CONTAINERS," Ser. No. 61/530,518, which is hereby incorporated by reference herein in its entirety. It should be noted that preferably the releasable coupling 30 also comprises a releasable sealed connector element operable to form a releasable connection with the conduit 44a so that it the conduit 44a can be readily disconnected if replacement or either component is necessary. In a preferred embodiment of the present invention, the sealed connector element of the releasable coupling 30 comprises a releasable adaptive pressurized filling that increases in strength and reliability in response to an increase in the pressure that is exerted in the PLSD system 10 (e.g., such as a pressurized "O-Ring" fitting).

Similarly, the use of such releasable adaptive pressurized fillings would be advantageous in all components of the PLSD system 10 in which connections with various conduits are made (in pressure container interfaces 40a and 40b (and in optional pressure container interface 40c), in an optional splitter 52 (e.g. a 3-way diverter valve), and in numerous other connections (not specifically identified in FIG. 2) involving the various pressurization conduits 42a, 42b, 42c, and 42d, and the various liquid transport conduits 44a, 44b, and 44c). Preferably, the pressure container interface 40b and the optional pressure container interface 40c comprise 1-way check valves (or combination control and 1-way check valves). While the liquid transport conduits 44a, 44b, and 44c may be of any sterile materials, preferably, they may be composed of flexible material that will enable the PLSD system 10 to take advantage of the "hammer effect" to increase the speed of the liquid being dispensed therethrough.

In accordance with the present invention, the various conduits utilized in connection with the PLSD system 10 comprise reliable, preferably flexible, tubing or equivalent, which may be composed from plastic (and related materials—e.g., polymers, etc.), or from suitable metal.

In some embodiments of the present invention, all conduits utilized in the PLSD system 10 may have uniform characteristics, whether employed for pressurization or for liquid transport functions (in which case when used for beverage dispensing, the conduits must be composed from non-reactive food-safe materials)—thus simplifying the PLSD system 10 maintenance and upkeep (i.e., since replacement conduits for either purpose may be readily cut and deployed as needed).

In other embodiments of the present invention, conduits utilized in the PLSD system 10 may have different characteristics, depending on whether they are employed for pressurization (e.g., conduits 42a, 42b, 42c, and 42d), or for liquid transport functions (e.g., conduits 44a, 44b, and 44c). In this case, the pressurization conduits do not need to be food-safe and may be more robust (such as through use of metal tubing), while the liquid transport conduits must be composed from non-reactive food-safe materials. Utilizing flexible materials for the liquid transport conduits 44a, 44b, and 44c enables the PLSD system 10 to take advantage of the "hammer effect" to increase the speed of the liquid being dispensed therethrough. Depending on their length, the liquid transport conduits 44b and 44c may also each include one or more corresponding controllable valves 46a, or 46b, 46c, respectively, which may be controllable 1-way valves, conventional 1-way check valves, or a combination thereof.

Optionally, one or more diverter valves may be included in one or more of the liquid transport conduits 44b and 44c to minimize the amount of liquid that can remain therein following each time the PLSD system 10 dispenses the liquid.

Optionally, one or more additional compressible liquid volumes 50 may also be stored inside the pressurized container 22a, and also subjected to the pressurized environment 22b during PLSD system 10 operation. The size and quantity of such additional compressible liquid volume(s) 50 may be selected as a matter of design choice (e.g., based on the size of the selected pressurized container 22a, etc.) without departing from the spirit of the invention.

In an alternate embodiment of the present invention, one of the at least one additional compressible liquid volumes 50, may be filled with a cleaning solution operable for cleaning and sanitizing the liquid transport conduits 44b, and 44c, with the interface element 40c comprising a controllable 3-way diverter valve and being positioned in-line in conduit 44a, such that when activated (for example by the control system 48a), the PLSD system 10 operation results in the cleaning solution from the compressible cleaning solution volume 50 passes through the same conduits, valves and related components as the main liquid being dispensed therethrough, thus ensuring that the PLSD system 10 remains clean and hygienic. The activation of the cleaning function can occur automatically in accordance with a predefined schedule, and/or automatically after a certain number of dispensing cycles, and can also be activated manually.

The pressurized container 22a preferably comprises an access component 22 (such as an airtight lid or other cover), that when opened, enables installation, removal, and/or replacement of the compressible liquid volume 28 (and/or of the additional compressible liquid volume(s) 50), and that when sealed, enables a controllable pressure system 18 to generate and maintain the desired pressurized environment 22b during PLSD system 10 operation.

The utilization of the controllable pressure system 18 by the PLSD system 10, is one of the key aspects of the present invention, in that the controllable pressure system 18 is not only operable to manage the pressurized environment 22b in the pressurized container 22a within desired parameters (especially as the compressible liquid volumes are depleted during PLSD system 10 operation), but also because its operation supports the deployment and utilization of the above-described dispensing profiles by one or more dispensing systems (e.g., by a control system 48a of a dispensing system 20a, and/or by an optional control system 48b of an optional dispensing system 20a).

In at least one exemplary embodiment thereof, the controllable pressure system 18 includes a pressure source 34 (such as a compressor, an air pump, or equivalent thereof) connected, via pressurization conduit(s) 42a, 42b, to a pressure regulator 38a, that is operable to control the operation of the pressure source 34 to adjust the pressurized environment 22b, as needed, via a pressurization conduit 42c that forms a pressurized seal with the pressure container interface 40a. Seal (not check-valve bi-direction)

Preferably, after configuration of the desired settings and parameters thereof, the pressure regulator 38a operates automatically in accordance with its settings and parameters. In an alternate embodiment of the present invention, a pressure regulator 38b (having equivalent functionality to the pressure regulator 38a), or its features may be integrated into the pressure source 34, instead of using the pressure regulator 38*a* (or in addition thereto, for example for enabling backup/failsafe system operation, e.g., in case the pressure regulator 38*a* fails).

Preferably, the controllable pressure system 18 also includes a pressure stabilizer 36 positioned between pressurization conduits 42*a* and 42*b*, operable to "store" pressurization generated by the pressure source 34, and thereby to support the operation of the pressure regulator 38*a* by serving as an interim "on-demand" source of pressure for the pressure regulator 38*a* without needing to intermittently activate/engage the pressure source 34. Optionally, the pressure stabilizer 36 may serve as an interim pressure source for another pressure regulator of another PLSD system (not shown) via the pressurization conduit 42*d*, such that the other PLSD system may share the pressure source 34 and the pressure stabilizer 36 with the PLSD system 10.

As was noted above, in connection with the description of the controllable pressure system 5 of FIG. 1, the controllable pressure system 18, and the various components thereof (34, 36, 38*a*), may be readily selected from a variety of devices/systems operable to generate and maintain the pressurized environment 22*b* within the desired parameters. For example, the controllable pressure system 18 can utilize non-air gas, or another fluid, such as compressed air and/or compressed CO2 tanks. Alternately, the pressure force for the controllable pressure system 18, may be generated through gravity, via one or more preconfigured compressed air/gas container, or through other non-pumping means, and/or through introduction of CO2 into the pressure regulator 38*a*.

The PLSD system 10 also includes the dispensing control system 20*a*, which may comprise: (1) a controllable valve 46*a* (e.g., a solenoid or other electromechanical valve) coupled to the compressible liquid volume 28 via the liquid transport conduit 44*b*, the container interface 40*b*, and the liquid transport conduit 44*a* (preferably with a 1-way check valve capability); and (2) the control system 48*a*, that comprises: (a) an electronic data processing system operable to execute program/control instructions (which may be implemented in virtually any configuration ranging from a solid state electronic controller, to a computerized system that is operable to independently control multiple electromechanical devices and to optionally interface with a more comprehensive liquid dispensing management system (for example, such as disclosed in the above-incorporated '491 application), (b) one or more suitable electromechanical control components operable, in response to the electronic data processing system, to control electromechanical valves (such as the controllable valve 46*a* (and optionally one or more additional controllable valve(s) 46*b*, 46*c* (e.g., if the optional additional compressible liquid volume 50 is employed))), and optionally to control other electromechanical devices (for example, such as one or more components of the controllable pressure system 18, a dispensing system 14*a*, etc.), and (c) optionally a remote controller component, which may include a mobile device with a corresponding software application comprising a graphical user interface, installed thereon.

The dispensing control system 20*a* is also connected to a dispensing system 14*a*, via the liquid transport conduit 44*c*.

If one or more optional additional compressible liquid volume(s) 50 are employed, the PLSD system 10 may include one or more optional dispensing control system(s) 20*b*, having a control system 48*b* and a controllable valve 46*c* (each of which may be provided in any of a variety of configurations described above in connection with the control system 48*a*, and the controllable valve 46*a*). The optional dispensing control system 20*b* is connected to a dispensing system 14*b*, and is operable to dispense the liquid from the compressible liquid volume(s) 50 therethrough.

Optionally, one or more stand-alone controllable valve(s) 46*b* may be provided that are controllable by the dispensing control system 20*a* (and/or by the dispensing control system 20*b*, if present), without need for a dedicated control system therefor. As is shown in FIG. 2 by way of example, the stand-alone controllable valve 46*b* may be used in conjunction with the additional compressible liquid volume 50 and the optional splitter 52, to execute rapid metered pours from the compressible liquid volume 50 to the dispensing system 14*a*, while the dispensing control system 20*b* is operable to simultaneously execute rapid metered pours from the compressible liquid volume 50 to the dispensing system 14*b*. Optionally, the above functions can be implemented utilizing a Y-adapter manifold.

The dispensing system 14*a* (and the optional dispensing system 14*b*, if present) may comprise any apparatus, device or system suitable for dispensing the liquid, preferably via rapid metered pours, into an appropriate container (e.g., a wine glass), when the dispensing function of the PLSD system 10 is activated. For example, the dispensing system 14*a* may be a simple spout, and/or it may include one or more additional features, including, but not limited to: (1) a vertically elongated housing comprising an opening sized and configured to receive a wine glass therein, such that the wine glass can be positioned beneath a pour element (not shown) to ensure that the dispensed liquid enters, and remains entirely within, the wine glass during the dispensing process, (2) an aeration module to additionally aerate the wine prior to it being dispensed (i.e. in addition to oxygenation that the wine is already subjected to, during its transport), (3) a local control (e.g., a button, and/or a switch, and/or a sensor) operable to cause the dispensing control system 20*a* (and/or the dispensing control system 20*b*) to dispense the liquid from the corresponding selected liquid volume 28 (or 50) in a metered pour, either manually (when activated by a user), or automatically (for example by signaling to the dispensing control system 6 when the wine glass is positioned and ready to receive the metered pour (for example through a pressure switch in a dispensing system 14*a* or 14*b* platform, on which the wine glass is positioned (as shown by way of example in the exemplary FIG. 3 illustrating an exemplary embodiment of a PLSD system 100), (4) an optional light source operable to illuminate the wine glass into which the liquid is being dispensed during the dispensing process, such that the cessation of the illumination serves as an indicator that the dispensation has been completed (the completion of the dispensation may also/alternately be indicated by other means, such as by an audio signal), and/or (5) a flow sensor (e.g., a flow meter), or equivalent means of sensing the quantity of liquid that has been dispensed in each metered pour.

Alternately, the dispensing system 14*a* (and/or the dispensing system 14*b*) may comprise a more complex system that integrates all, or part, of the functionality of the dispensing control system 20*a* (and/or of the dispensing control system 20*b*) and may also comprise at least one of the above-noted features.

Optionally, the dispensing control system 20*a* (and/or of the dispensing control system 20*b*) may be connected to the controllable pressure system 18 (or to individual component(s) thereof), such that it may be operable to provide any necessary control functions, such as pressure maintenance/regulation. In an alternate embodiment of the present invention, when activated (for example, from the dispensing system 14a through a link therewith), the dispensing control system 20a may instruct the controllable pressure system 18 to briefly increase the level of pressure in the pressurized environment 22b for all (or for a portion of the duration of a dispensing period) to provide additional force and velocity to liquid being expelled from the compressible liquid volume 28 (for example if the dispensing system 14a is particularly distant from the pressurized container 22a), thus temporarily modifying the predefined pressure vs. time algorithm(s).

In an alternate embodiment of the PLSD system 10, the pressurized container 22a may be positioned in a temperature controlled environment 54 that is suitable for temperature stable storage of the liquid being dispensed from the compressible liquid volume 28 (and/or from the compressible liquid volume 50). The temperature controlled environment 54 may be passive (such as a cellar/basement), active (such as a refrigerated housing (or refrigerated jacketing or coils positioned around the pressurized container 22a), or a cold plate (or equivalent), or ice or equivalent freezable cold elements, positioned proximally to the pressurized container 22a (such under the bottom thereof), or a combination of one or more of the above (such as a climate controlled wine cellar). Additionally, an individual temperature control component (such as a cooling jacket around a wine bag) may be positioned surrounding any liquid volume stored in the pressurized container 22a that requires lower temperatures for optimal storage (e.g. the liquid volume 28 and/or 50).

Other than as is noted above, the PLSD system 10 operates in a manner substantially similar as described above in connection with the PLSD system 1 of FIG. 1, with respect to its activation, the use of various dispensing profiles (e.g., one or both of the dispensing control systems 20a, 20b be utilize the same, overlapping or different dispensing profiles).

Referring now to FIG. 3, a third exemplary embodiment of the inventive system and method for storing and selectively dispensing liquids is shown as a PLSD system 100, configured as an exemplary implementation of the PLSD system 10 of FIG. 2, with the relevant components and functions being labeled.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

The invention claimed is:

1. A system for selectively managing dispensing of a portion of a liquid volume stored in a pressurized environment, the system comprising:
an incompressible, pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion, the incompressible, pressurized container maintaining a temperature controlled environment, the temperature controlled environment being capable of maintaining a stable temperature of a liquid volume being dispensed from the incompressible, pressurized container;
a dispensing system including a plurality of liquid transport conduits and a multi-pour nozzle, the plurality of liquid transport conduits including a first liquid transport, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, the first liquid transport conduit including a valve to enable or disable a flow of the liquid volume, the multi-pour nozzle comprising a plurality of nozzle elements, each of the plurality of nozzle elements capable of being connected to a different liquid transport conduit, each of the different liquid transport conduits being capable of being coupled to a different compressible container by a different releasable connection;
a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of the first compressible container in the internalized pressurized environment; and
a control system operable to selectively open and close the valve.

2. The system of claim 1 wherein the temperature controlled environment includes a cold plate positioned proximally to a first portion of the pressured container.

3. The system of claim 1, wherein the internal pressurized environment is capable of receiving at least two compressible pressurized containers.

4. The system of claim 3 wherein, the temperature controlled environment includes individual temperature control components positioned around each of the at least two compressible pressurized container in the internal pressurized environment.

5. The system of claim 1, wherein the pressurized liquid comprises an alcoholic beverage.

6. The system of claim 5 wherein the alcoholic beverage comprises a wine.

7. The system of claim 1, wherein the multi-pour nozzle is configured to be equipped with a blend pour functionality, enabling pressurized liquid from two or more dispensing conduits to be dispensed in a blended pour.

8. The system of claim 7, wherein the multi-pour nozzle comprises 2 to 9 nozzle elements.

9. The system of claim 8, wherein the control system is remotely operable to selectively activate substantially simultaneously two or more nozzle elements to enable the blend pour functionality.

10. A system for selectively managing dispensing of a portion of a liquid volume stored in a pressurized environment, the system comprising:
- an incompressible, pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion, the incompressible, pressurized container maintaining a temperature controlled environment, the temperature controlled environment being capable of maintaining a stable temperature of a liquid volume being dispensed from the incompressible, pressurized container;
- a dispensing system including a plurality of liquid transport conduits, the plurality of liquid transport conduits including a first liquid transport, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, the first liquid transport conduit including a valve to enable or disable a flow of the liquid volume;
- a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of the first compressible container in the internalized pressurized environment; and
- a control system operable to selectively open and close the valve, the control system being remotely operable to control the pressure regulation system to exert the pressure level in the internal pressurized environment to enable compression of the compressible pressurized container in the internal pressurized environment.

11. The system of claim 1, wherein the valve is a solenoid valve.

12. The system of claim 11, wherein the solenoid valve is coupled to a wall of the hollow housing portion.

13. A method comprising:
- receiving a first signal to change a temperature of a temperature controlled environment within an incompressible, pressurized container, the pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion, the temperature controlled environment affecting at least a section of the hollow housing portion;
- changing the temperature of the temperature controlled environment based on the first signal, the temperature controlled environment being capable of maintaining the temperature of a liquid volume being dispensed from the incompressible, pressurized container;
- receiving a second signal from a control signal to open a first value of the incompressible, pressurized container; and
- in response to the first signal to open the first value, opening a first valve of a first liquid transport conduit of a plurality of liquid transport conduits to enable or disable a flow of a liquid volume from the first compressible container, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, at least one pressure conduit extending from the outer portion through a pressure interface and into the hollow housing portion of the pressurized container, a pressure regulation system operable to exert and maintain the pressure level within the pressurized container to enable compression of the first compressible container in the internalized pressurized environment, the dispenser including a multi-pour nozzle, the multi-pour nozzle comprising a plurality of nozzle elements, each of the plurality of nozzle elements capable of being connected to a different liquid transport conduit, each of the different liquid transport conduits being capable of being coupled to a different compressible container by a different releasable connection.

14. The method of claim 13, wherein the temperature controlled environment includes a cold plate positioned proximally to a first portion of the pressured container.

15. The method of claim 13, wherein the internal pressurized environment is capable of receiving at least two compressible pressurized containers.

16. The method of claim 15 wherein, the temperature controlled environment includes individual temperature control components positioned around each of the at least two compressible pressurized container in the internal pressurized environment.

17. The method of claim 13, wherein the multi-pour nozzle is configured to be equipped with a blend pour functionality, enabling pressurized liquid from two or more dispensing conduits to be dispensed in a blended pour.

18. A method comprising:
- receiving a first signal to change a temperature of a temperature controlled environment within an incompressible, pressurized container, the pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion, the temperature controlled environment affecting at least a section of the hollow housing portion;

changing the temperature of the temperature controlled environment based on the first signal, the temperature controlled environment being capable of maintaining the temperature of a liquid volume being dispensed from the incompressible, pressurized container;

receiving a second signal from a control signal to open a first value of the incompressible, pressurized container; and in response to the first signal to open the first value, opening a first valve of a first liquid transport conduit of a plurality of liquid transport conduits to enable or disable a flow of a liquid volume from the first compressible container, the plurality of liquid transport conduit including the first liquid transport, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, at least one pressure conduit extending from the outer portion through a pressure interface and into the hollow housing portion of the pressurized container, a pressure regulation system operable to exert and maintain the pressure level within the pressurized container to enable compression of the first compressible container in the internalized pressurized environment, the control signal being remotely operable to control a pressure regulation system to exert the pressure level in the internal pressurized environment to enable compression of the compressible pressurized container in the internal pressurized environment.

19. The method of claim 13, wherein the valve is a solenoid valve.

20. The method of claim 19, wherein the solenoid valve is coupled to a wall of the hollow housing portion.

* * * * *